United States Patent
Wessling et al.

(10) Patent No.: US 9,557,438 B2
(45) Date of Patent: Jan. 31, 2017

(54) SYSTEM AND METHOD FOR WELL DATA ANALYSIS

(71) Applicants: Stefan Wessling, Hannover (DE); Daniel Moos, Palo Alto, CA (US); John D. Macpherson, Spring, TX (US)

(72) Inventors: Stefan Wessling, Hannover (DE); Daniel Moos, Palo Alto, CA (US); John D. Macpherson, Spring, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 753 days.

(21) Appl. No.: 13/914,805

(22) Filed: Jun. 11, 2013

(65) Prior Publication Data
US 2014/0121972 A1     May 1, 2014

Related U.S. Application Data

(60) Provisional application No. 61/718,938, filed on Oct. 26, 2012.

(51) Int. Cl.
*G01V 11/00* (2006.01)
*E21B 41/00* (2006.01)

(52) U.S. Cl.
CPC .............. *G01V 11/002* (2013.01); *E21B 41/00* (2013.01); *G01V 2210/74* (2013.01)

(58) Field of Classification Search
CPC ....... G01V 11/002; E21B 44/00; E21B 47/066
USPC .... 702/6, 9, 11, 14; 166/250.15; 175/24, 40; 73/152.59; 703/10
See application file for complete search history.

(56) References Cited

U.S. PATENT DOCUMENTS

| 5,216,917 A | 6/1993 | Detournay |
| 2002/0103630 A1 | 8/2002 | Aldred et al. |
| 2005/0171698 A1 | 8/2005 | Sung et al. |
| 2007/0168056 A1 | 7/2007 | Shayegi et al. |

(Continued)

FOREIGN PATENT DOCUMENTS

| EP | 1297244 A1 | 4/2003 |
| WO | 03100537 A1 | 12/2003 |

OTHER PUBLICATIONS

Nicolau, M., Levine, A.J., Carlsson, G., (2011), "Topology based data analysis identifies a subgroup of breast cancers with a unique mutational profile and excellent survival", PNAS, Apr. 26, 2011, vol. 108, No. 17, pp. 7265-7270, www.pnas.org/cgi/doi/10.1073/pnas.1102826108.

(Continued)

*Primary Examiner* — John H Le
(74) *Attorney, Agent, or Firm* — Cantor Colburn LLP

(57) ABSTRACT

A method of processing data generated from an energy industry or oilfield operation includes: receiving a data set representing parameter values generated during at least a portion of the operation, the parameter values including values of a plurality of parameters relating to the operation; dividing the data set into a plurality of data subsets, each data subset including values for multiple parameters; determining a measure of similarity between data in each subset relative to data in one or more other subsets; displaying a map of the data set in at least two dimensions, the map including a visual representation of each subset positioned relative to a visual representation of the one or more other subsets based on the measure of similarity; and analyzing the map to estimate a condition associated with the operation.

20 Claims, 11 Drawing Sheets

(56) References Cited

U.S. PATENT DOCUMENTS

| | | |
|---|---|---|
| 2008/0097735 A1 | 4/2008 | Ibrahim et al. |
| 2009/0020284 A1* | 1/2009 | Graf ........................ E21B 44/00 166/250.15 |
| 2009/0250264 A1 | 10/2009 | Dupriest |
| 2010/0282510 A1 | 11/2010 | Sullivan et al. |
| 2012/0118637 A1 | 5/2012 | Wang et al. |
| 2012/0158761 A1 | 6/2012 | Aamodt et al. |

OTHER PUBLICATIONS

Notification of Transmittal of the International Search Report and the Written Opinion of the International Searching Authority, or the Declaration; PCT/US2013/066572; Date of mailing: Jan. 24, 2014.

\* cited by examiner

| TIME.S | Time.Min | CALCX.in | SSLIPDX | FLOWIN | GAINLOSS | TOTGAS.% | ROP_AVG | MOTOR_R | ACTECDX. | RACLX.oh | RPCHX.oh | DTPX. |
|---|---|---|---|---|---|---|---|---|---|---|---|---|
| 1277505900 | 1277505900 | Null | Null | 551 | 11 | 0.1788 | 92.6 | 184 | 12.83 | 0.292 | 0.119 | 100 |
| 1277505930 | 0.5 | 8.729 | | 553 | 12 | 0.1787 | 97.7 | 184 | 12.81 | 0.299 | 0.107 | 102 |
| 1277505960 | 1 | 8.729 | 3 | 554 | 12 | 0.1784 | 93.4 | 185 | 12.83 | 0.315 | 0.143 | 103 |
| 1277505990 | 1.5 | 8.729 | Null | 548 | 12 | 0.1786 | 91.7 | 182 | 12.87 | 0.321 | 0.139 | 103 |
| 1277506020 | 2 | 8.729 | 3 | 550 | 10 | 0.1788 | 88.2 | 183 | 12.87 | 0.306 | 0.1 | 102 |
| 1277506050 | 2.5 | 8.729 | 2 | 550 | 9 | 0.1792 | 92.5 | 183 | 12.85 | 0.292 | 0.108 | 101 |
| 1277506080 | 3 | 8.729 | 3 | 549 | 10 | 0.1796 | 100.5 | 183 | 12.83 | 0.294 | 0.186 | 88 |

110

| Time.Min | 1.28E+09 | 0.5 | 1 | 1.5 | 2 | 2.5 | 3 | 3.5 | 4 | 4.5 | 5 | 5.5 | 6 | 6.5 | 7 | 7.5 |
|---|---|---|---|---|---|---|---|---|---|---|---|---|---|---|---|---|
| CALCX.in | Null | 8.729 | 8.729 | 8.729 | 8.729 | 8.729 | 8.729 | 8.729 | 8.729 | 8.591 | 8.729 | 8.729 | 8.591 | 8.729 | 8.729 | 8.729 |
| SSUPDX.un | Null | 1 | 3 | Null | 3 | 2 | 3 | 2 | 2 | 2 | 1 | 3 | 2 | 2 | 3 | Null |
| FLOWIN.US | 551 | 553 | 554 | 548 | 550 | 550 | 549 | 551 | 546 | 546 | 548 | 549 | 551 | 549 | 549 | 551 |
| GAINLOSS | 11 | 12 | 12 | 12 | 10 | 9 | 10 | 11 | 11 | 8 | 10 | 10 | 11 | 11 | 12 | 10 |
| TOTGAS.% | 0.1788 | 0.1787 | 0.1784 | 0.1786 | 0.1788 | 0.1792 | 0.1796 | 0.1798 | 0.1799 | 0.1799 | 0.1798 | 0.1794 | 0.1792 | 0.179 | 0.1787 | 0.1784 |
| ROP_AVG. | 92.6 | 97.7 | 93.4 | 91.7 | 88.2 | 92.5 | 100.5 | 104.8 | 104.6 | 109.6 | 106.1 | 105.1 | 110.1 | 110.6 | 96.2 | 86.5 |

SYSTEM AND METHOD FOR WELL DATA ANALYSIS

BACKGROUND

Large amounts of data and information are typically acquired during energy industry operations, such as exploration, formation evaluation, production and drilling operations. For example, the analysis and interpretation of such drilling data to identify an optimum drilling efficiency and wellbore stability is challenging because drilling is a complex process with multiple unknowns. Analysis and interpretation of the large amounts of data related to such operations is difficult without appropriate methods which extract relevant information and present it in an understandable way.

SUMMARY

A method of processing data generated from an energy industry or oilfield operation includes: receiving a data set representing parameter values generated during at least a portion of the operation, the parameter values including values of a plurality of parameters relating to the operation; dividing the data set into a plurality of data subsets, each data subset including values for multiple parameters; determining a measure of similarity between data in each subset relative to data in one or more other subsets; displaying a map of the data set in at least two dimensions, the map including a visual representation of each subset positioned relative to a visual representation of the one or more other subsets based on the measure of similarity; and analyzing the map to estimate a condition associated with the operation.

A system for processing data generated from an energy industry or oilfield operation includes at least one carrier configured to be disposed in a borehole in an earth formation, a plurality of sensors configured to measure parameters associated with the operation and a processor. The processor is configured to perform: receiving a data set representing parameter values generated during at least a portion of the operation, the parameter values including values of a plurality of parameters relating to the operation; dividing the data set into a plurality of data subsets, each data subset including values for multiple parameters; determining a measure of similarity between data in each subset relative to data in one or more other subsets; displaying a map of the data set in at least two dimensions, the map including a visual representation of each subset positioned relative to a visual representation of the one or more other subsets based on the measure of similarity; and analyzing the map to estimate a condition associated with the operation.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

FIG. 12 depicts an example of drilling data; and

DETAILED DESCRIPTION

There are provided systems and methods for well data generation and analysis, as well as control of downhole operations, using statistical data analysis (e.g., topological data analysis) to generate a visual representation of data parameters and/or using case-based reasoning of relevant well data. The visual representation, in one embodiment, is a visual map that represents subsets of data as clusters, nodes or other visual identifiers and spatially organizes the identifiers based on similarities or other relationships between data values in the subsets. One embodiment of a visual representation is a topological data map that represents subsets of a data set as nodes or clusters and spatially positions the nodes based on similarities or differences between nodes. Exemplary well data includes drilling data, formation and/or borehole measurement data, status data, control data and quality control data associated with energy industry (e.g., oil and gas) operations. The systems and methods described herein may be used to map operational and/or borehole statuses, monitor operating conditions and/or predict conditions such as abnormal drilling conditions to, e.g., prevent hazards. For example, regions or structures generated as part of a topological map may be used to identify certain drilling conditions, correlate different parameters associated with a drilling operation and/or provide a way to predict downhole conditions or behavior.

The systems and methods may be used to analyze numerical data and/or categorical data. Numerical data may include a measure of a process, e.g. temperature; categorical data is a description of a state, e.g. cold or hot, cold or not-cold. Numerical data typically forms a continuum, whereas categorical data typically does not. In addition, the systems and methods may be used to map categorical or meta-information relating to a drilling or other operation, and/or related to a condition. Examples of such data include weather conditions, rig heave, drilling crews, working hours of drilling crews, expenditures, types of drilling contracts, amount of people on a rig and others.

Figure 1:
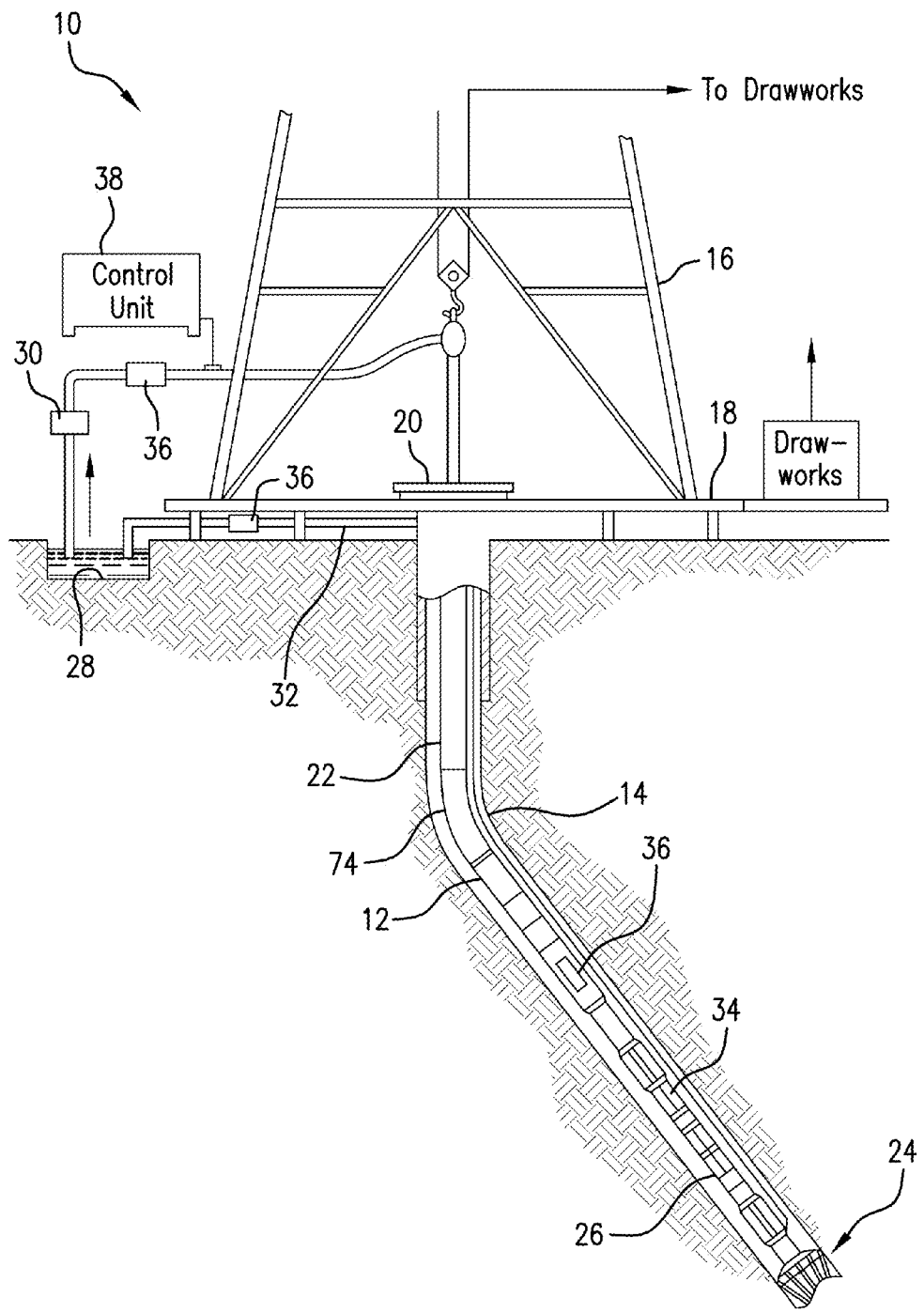
FIG. 1 is a side cross-sectional view of an embodiment of a subterranean well drilling, evaluation, exploration and/or production system.

Referring to FIG. 1, an exemplary embodiment of a well drilling, measurement, evaluation and/or production system 10 includes a borehole string 12 that is shown disposed in a borehole 14 that penetrates at least one earth formation during a downhole operation, such as a drilling, measurement and/or hydrocarbon production operation. In the embodiment shown in FIG. 1, the borehole string is configured as a drill string. However, the system 10 and borehole string 12 are not limited to the embodiments described herein, and may include any structure suitable for being lowered into a wellbore or for connecting a drill or downhole tool to the surface. For example, the borehole string 12 may be configured as wired pipe, coiled tubing, a wireline or a hydrocarbon production string.

In one embodiment, the system 10 includes a derrick 16 mounted on a derrick floor 18 that supports a rotary table 20 that is rotated by a prime mover at a desired rotational speed. The drill string 12 includes one or more drill pipe sections 22 or coiled tubing, and is connected to a drill bit 24 that may be rotated via the drill string 12 or using a downhole mud motor. The system 10 may also include a bottomhole assembly (BHA) 26.

During drilling operations a suitable drilling fluid from, e.g., a mud pit 28 is circulated under pressure through the drill string 12 by one or more mud pumps 30. The drilling fluid passes into the drill string 12 and is discharged at a wellbore bottom through the drill bit 24, and returns to the surface by advancing uphole through an annular space between the drill string 12 and the borehole wall 14 and through a return line 32.

Various sensors and/or downhole tools may be disposed at the surface and/or in the borehole 12 to measure parameters of components of the system 10 and or downhole parameters. Such parameters include, for example, parameters of the drilling fluid (e.g., flow rate, temperature and pressure), environmental parameters such as downhole vibration and hole size, operating parameters such as rotation rate, weight-on-bit (WOB) and rate of penetration (ROP), and component parameters such as stress, strain and tool condition. Other parameters may include quality control parameters, such as data classifications by quality, or parameters related to the status of equipment such as operating hours.

For example, a downhole tool 34 is incorporated into any location along the drill string 12 and includes sensors for measuring downhole fluid flow and/or pressure in the drill string 12 and/or in the annular space to measure return fluid flow and/or pressure. Additional sensors 36 may be located at selected locations, such as an injection fluid line and/or the return line 32. Such sensors may be used, for example, to regulate fluid flow during drilling operations. Downhole tools and sensors may include a single tool or multiple tools disposed downhole, and sensors may include multiple sensors such as distributed sensors or sensors arrayed along a borehole string.

In one embodiment, the downhole tool 34, the BHA 26 and/or the sensors 36 are in communication with a surface processing unit 38. In one embodiment, the surface processing unit 38 is configured as a surface drilling control unit which controls various production and/or drilling parameters such as rotary speed, weight-on-bit, fluid flow parameters, pumping parameters. The surface processing unit 38 may be configured to receive and process data, such as measurement data and modeling data, as well as display received and processed data. Any of various transmission media and connections, such as wired connections, fiber optic connections, wireless connections and mud pulse telemetry may be utilized to facilitate communication between system components.

The downhole tool 34, BHA 26 and/or the surface processing unit 38 may include components as necessary to provide for storing and/or processing data collected from various sensors therein. Exemplary components include, without limitation, at least one processor, storage, memory, input devices, output devices and the like.

The sensors and downhole tool configurations are not limited to those described herein. The sensors and/or downhole tool 34 may be configured to provide data regarding measurements, communication with surface or downhole processors, as well as control functions. Such sensors can be deployed before, during or after drilling, e.g., via wireline, measurement-while-drilling ("MWD") or logging-while-drilling ("LWD") components. Exemplary parameters that could be measured or monitored include resistivity, density, porosity, permeability, acoustic properties, nuclear-magnetic resonance properties, formation pressures, properties or characteristics of the fluids downhole and other desired properties of the formation surrounding the borehole 14. The system 10 may further include a variety of other sensors and devices for determining one or more properties of the BHA (such as vibration, bending moment, acceleration, oscillations, whirl, stick-slip, etc.) and drilling operating parameters, such as weight-on-bit, fluid flow rate, pressure, temperature, rate of penetration, azimuth, tool face, drill bit rotation, etc.

The data utilized in the systems, devices and methods described herein may be generally referred to as "well data", and is not limited to the specific data types described herein. Well data may include any data of interest in energy industry operations.

The well data generated and collected during a downhole operation, e.g., via system 10, is analyzed to enable improved understanding of the formation, downhole system and/or operational parameters. Analysis methods include topology-based analyses, in which measurement and/or operational states are identified by groupings or clusters of data values to reveal how "close" a given state is to other states. An inherent advantage of the methods described herein is that they enable extremely high-dimensional data to be reduced to a limited number of dimensions for visualization and improved understanding.

Prior art approaches, which include applying artificial intelligence, neural networks or other statistical approaches, have inadequacies, in part because they are limited with respect to the size of the data they can handle. In addition, such approaches do not reveal internal relationships between different parameters, whereas the methods described herein provide a graphical display of such relationships, e.g., in the form of structures of a data map. The methods described herein do not require a priori knowledge of a system and can handle arbitrarily large data sets.

The analyzed well data can be intuitively displayed as "topological maps" to associate the current state of a well with similar states experienced previously, enabling prediction of the future state of the system and selection of optimal methods to avoid non-productive time. Topological maps of wells will be similar if those wells share similar behavior, allowing predictions in advance of the likelihood of particular events occurring in a well as it is being drilled.

Figure 2:
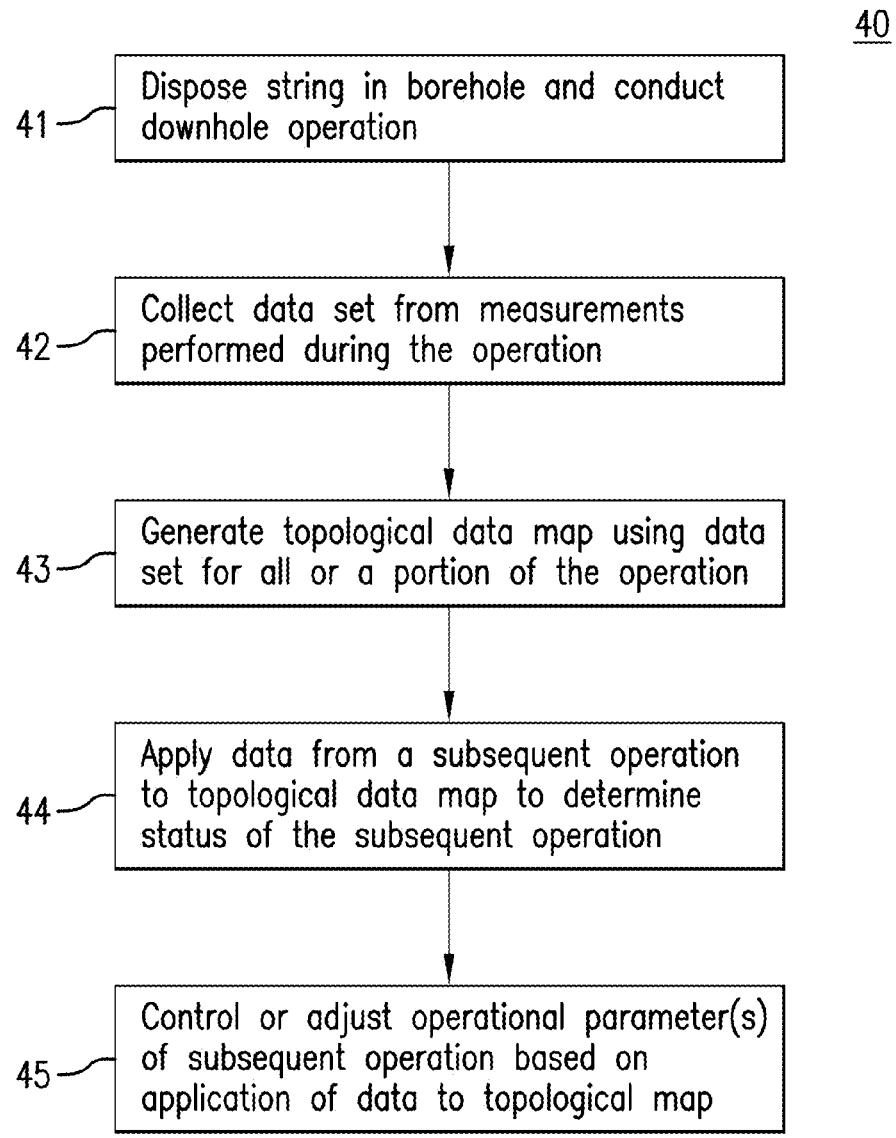
FIG. 2 is a flow chart illustrating a method of performing a downhole operation, analyzing data generated during the operation and/or controlling the operation based on the data analysis.

FIG. 2 illustrates a method 40 of well data analysis, prediction and/or downhole operation control. The method 40 is used in conjunction with the system 10 and/or the surface processing unit 38, although the method 40 may be utilized in conjunction with any suitable combination of sensing devices and processors. The method 40 includes one or more stages 41-45. In one embodiment, the method 40 includes the execution of all of stages 41-45 in the order described. However, certain stages may be omitted, stages may be added, or the order of the stages changed. This method is not restricted to embodiments described herein, such as analysis of drilling data, and may be used in conjunction with any data relating to measurement or operational parameters of interest to the energy industry.

In the first stage 41, well data is generated and/or collected. For example, a drill string, logging string and/or production string 12 is disposed within the wellbore 14 and a downhole operation is performed. During the operation, parameters such as fluid pressure, temperature or drilling parameters are estimated via sensor devices (e.g., the sensors 36 and/or the downhole tool 34). Data sets that can be utilized with the method 40 include any structured and/or unstructured data and information that are acquired during all or a portion of a drilling or other energy industry process.

For example, well drilling operations are typically accompanied by acquisition of large amounts of data and information acquired via surface and/or downhole sensors. Examples of data parameters acquired at the surface include hook load, rotations per minute, strokes per minute, pit volume, and the flow rate of mud into and/or out of a borehole. Examples of data parameters acquired by a downhole tool or along the drill string include downhole annular pressure and temperature, formation resistivity, acoustic slowness, gamma ray measurements, magnetic resonance of the formation, the bending moment of a downhole tool, accelerations, orientation of the borehole and formation pressures. To avoid missing key relationships or indicators, additional data parameters not usually considered useful to inform decisions can also be added. Examples of such data include weather related metrics and measures of the status of equipment e.g. hours in service.

Parameters to be considered include not only instant parameter values, but may also include time-changing processes or trends. For example, a cluster of data representing a first state might be identical to a second cluster of data representing a second state, except that the immediately adjacent or subsequent state is different.

In the second stage 42, a data set including and/or related to parameters of interest are selected. Such parameters may include raw data parameters, such as temperature, pressure, electromagnetic signals and others. Parameters may also include calculated parameters, such as ROP, fluid composition and tool wear. For example, parameters can include drilling statuses such as drilling vibrations, changes in the ROP accompanied by changes in the lithology, the accumulation of cuttings, the degradation of the quality of some data acquired during a drilling operation, and influx of formation fluid into the wellbore.

In the third stage 43, one or more topological data sets, referred to herein as "maps", are developed using parameter data. The map may be initially generated using a pre-existing data set, and/or developed in real time or near real time as data is generated. The map is generated using mathematical methods including topological data analysis. The output of such an analysis is a combinatorial graph or other visual output that has a shape indicative of characteristics of the data.

The output can be multi-resolution, allowing for scaling of the map or parts of the map at different resolutions. For example, the output has two resolution parameters, which allow one to view the data set at higher or lower resolution. This is advantageous relative to prior art network modeling, in that it avoids compression of the data set leading to hairball networks (visualizations of networks as a dense masses of connections somewhat resembling hairballs) which are very difficult to interpret.

The networks shown by such topological maps are intuitive and provide easy interaction with the data. Users may select subsets from the network. These subsets may then be subjected to standard statistical analysis to determine the variables which characterize them, or one may apply the network construction to the subsets to drill down on their structure. These capabilities permit effective exploration of data sets.

Figure 3:
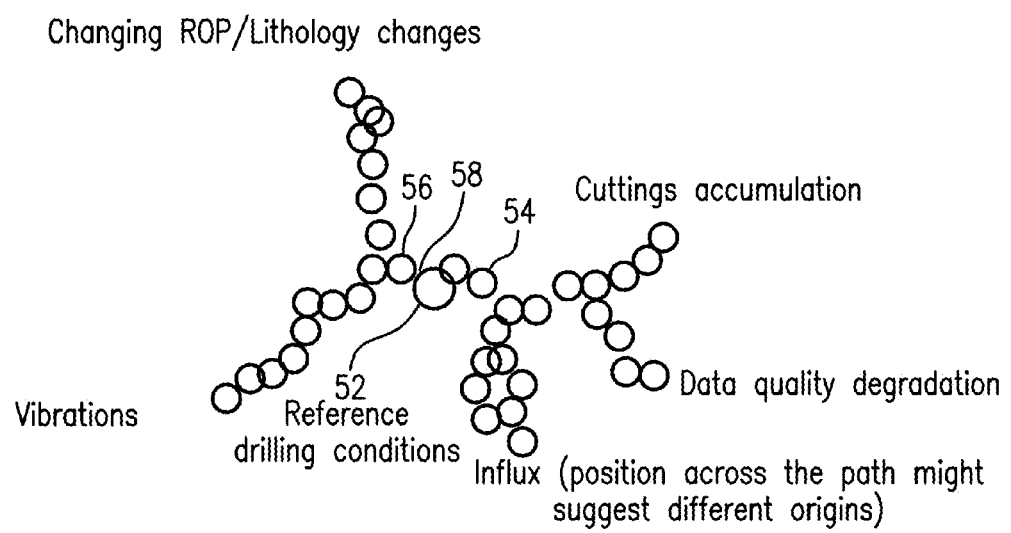
FIG. 3 depicts an exemplary display of a topological map of data generated during a downhole operation.

FIG. 3 illustrates an exemplary topological map 50 that illustrates a drilling data set that shows operational differences relative to a reference drilling status. A set of drilling data from a borehole or drilling operation is used as an input to generate the map 50. The map 50 allows for visualization of data beyond a simple two-dimensional representation of data (e.g., parameters x and y) and allows for visualization of multi-dimensional data (e.g., multiple parameters) beyond two or three dimensions.

The drilling data set is used as an input into a mapping algorithm. The data set includes parameter values related to drilling parameters or conditions such as ROP, fluid (e.g., water) influx, vibrations and cuttings accumulation. Other parameters can be related to data quality (degradation, signal-to-noise ratio, etc.)

Subsets of data having similar values are identified and grouped as subsets. These subsets are also referred to as local "clusters" (which may also be referred to as "nodes"), and represent data for multiple parameters that have similar values. For example, each data cluster can be a set of parameter values associated with a certain time point or interval or a certain depth point or interval. Each local cluster can be viewed as a bin of data points.

The data set is collected as a number of parameters, each parameter including one or more values associated with respective times or depths (e.g., as a column of values). Each subset may be considered to be associated with a selected time/depth point or range, e.g., include a value for each of multiple parameters associated with a time or depth point or range.

In one embodiment, identifying the subsets includes transposing the data set (e.g., exchange rows and columns) so that each time or depth is considered a parameter to include in a cluster. In this embodiment, each subset is considered to be associated with a selected parameter or group of parameters, e.g., include a value for multiple times/depths associated with each selected parameter. Thus, each subset represents a population of values for each selected parameter. This transposition allows time dependence to be explicitly analyzed without the need to convert time or depth points into trends.

Once all data points have been assigned to clusters, "edges" are added by connecting two clusters having data points in common by an edge (e.g., a line or overlap), to generate a network of clusters. The network reflects the underlying geometry of the data set, in that it retains the connections between data points which are very near to each other.

For example, FIG. 3 shows a topological map 50 that includes a central cluster 52. The central cluster 52 may be any selected cluster of data having similar data values, e.g., a cluster of data associated with a selected initial time or depth. Each cluster, in one embodiment, is associated with a status of the operation or operational state. The cluster 52 can be used as a reference cluster indicating a reference state of the operation. A plurality of clusters 54 are positioned relative to one another based on their "nearness" to one another, i.e., how close the data values in one cluster are to data values in another cluster. The subsets or clusters are shown in FIG. 3 as circles, but can be represented in any suitable manner.

As an illustration, an exemplary cluster 56 is shown that has data values that deviate from the central cluster, but have one or more data values that are the same (or that are within a selected range). The common value(s) results in connecting the cluster 52 to the cluster 56 via an edge 58. The direction of separation between clusters 52 and 56 depends upon which data values of the cluster 56 are different than the data values of cluster 52. In this example, the data values corresponding to ROP changes and/or vibration deviate more strongly than other data values, and as a result, the cluster 56 is positioned at a direction associated with a drilling state having increased ROP and/or vibration states.

As can be seen in the map 50, data clusters 54 are positioned relative to one another based on how the operational state differs. For example, data clusters progressing along the left hand side may indicate drilling conditions in which the ROP changes significantly or vibration increases significantly. Likewise, data clusters on the right hand side may indicate drilling conditions in which influx and/or cuttings accumulation is a factor in the operational state.

Thus, the topological maps can be used to analyze and interpret specific tasks or events that are relevant to the outcome of the downhole operation. One exemplary outcome for a drilling operation is the monitoring of related data to detect events that are indicative of drilling operational challenges. Once such events are identified, mitigation activities can be conducted to increase the overall drilling performance and/or to ensure wellbore stability. Examples of drilling events include pack-offs, influx of formation fluid into the wellbore, losses of drilling fluid into the formation, vibrations of the BHA and/or the drill string, bit wear or failure, downhole tool washouts (e.g., holes or leaks in tools or components created by circulating fluid and/or erosion of tool or component internals by fluid flow) and others.

Developing topological maps such as the map 50 may include, in addition to selecting well data, selecting input parameters or criteria that govern how each cluster is positioned and related to other clusters. Such input parameters include, in one embodiment, distance metrics, filter functions (also referred to as lenses), resolution and gain. The distance metric provides a numerical definition of distance and is a measure of similarity. Examples of the distance metric include Cosine, Variance Normalized Euclidean, Variance normalized density and Normalized correlation. Exemplary filter functions include Gaussian Density, L-infinity Centrality and the principle components of Singular Value Decomposition (SVD). Applying different metrics and lenses can result in different topologies for a given data set. In addition, using different resolution and gains for the creation of topology maps may hide or expose structures that can be relevant to reveal a drilling condition.

In one embodiment, the data set is equipped with a metric, such as a distance function or a dissimilarity function, that facilitates determining the relative differences between individual data clusters. Examples include Euclidean or normalized Euclidean distance, cosine and angle metrics, correlation distance (e.g., Pearson correlation), and probability density functions. Other examples include measurement of centrality and extremity functions, and variance functions.

In one embodiment, the filter function is applied to each cluster to provide an indication of filter values. For example, clusters can have different sizes, shapes, brightnesses, colors or other visual indications based on the filter function value for each cluster.

The clusters described herein are shown as having substantially the same shape and size, but need not be so limited. Different data sets can have different shapes, and individual clusters can be represented using any suitable visual representation.

In the fourth stage 44, topological maps developed using collected data are used to analyze subsequent operational and/or formation data, predict future events, and/or understand the status of a current well or operation. For example, analysis is conducted by comparing drilling related events using the position of a subset of data within a topological map of a previously collected data set or in relation to a currently generated map.

For example, once data have been analyzed and interpreted and drilling-related events and conditions have been identified, those events and statuses can be compared to events and statuses from previously drilled boreholes in which drilling operational challenges were encountered. This process of comparison to find similarities is referred to as case-based reasoning, which can be applied to address operational challenges by accessing experience from historical drilling data and activities. Identified drilling events and conditions are compared to events and conditions from previously drilled wells in order to identify historical wells where drilling operational challenges have been experienced, aiming to avoid the same challenges again.

Figure 4:
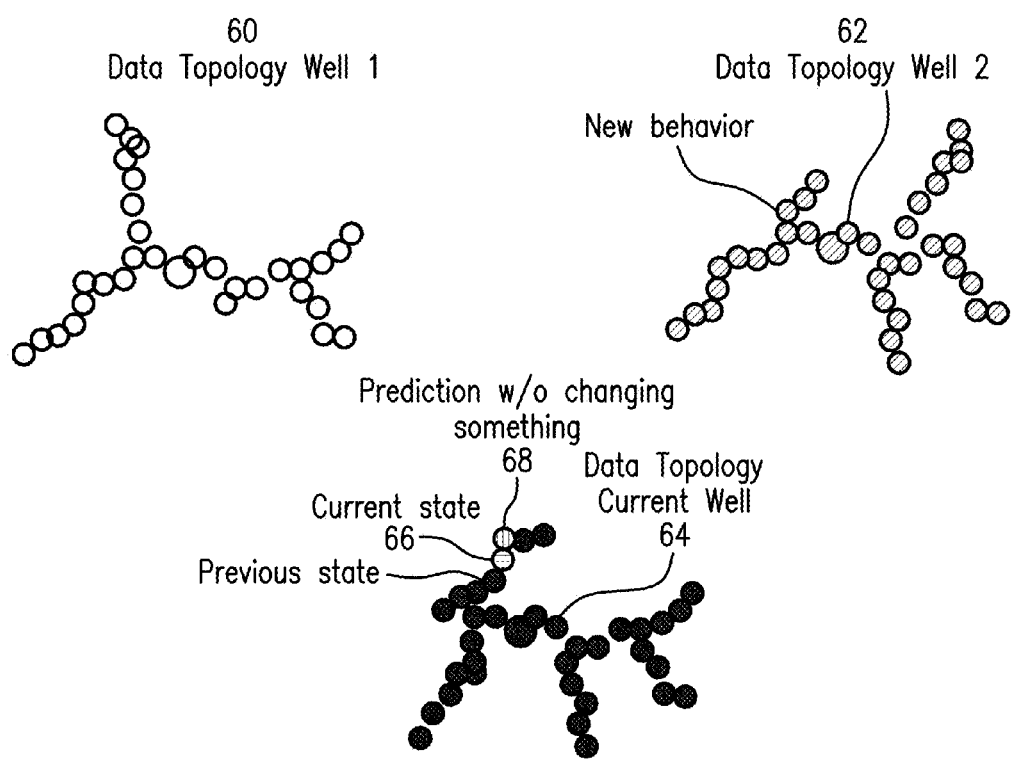
FIG. 4 depicts exemplary topological maps of historical data and comparison of currently generated data to topological maps.

An analysis example is described in conjunction with FIG. 4, which shows an exemplary visualization of the data topology from two historical wells and the data topology of a currently drilled well. Different wells will have different behaviors, and these behaviors will manifest as different shapes of an associated topological map or diagram. A first historical topological map 60 is shown that was generated by a drilling operation in a first well, and a second historical topological map 62 is shown that was generated by a drilling operation in a second well.

A current topological map 64 is shown that reflects measurement data generated in real-time or near real-time during an ongoing drilling operation. At selected times (or periodically or substantially continuously) a data subset reflecting the current operation is applied to the current topological map 64. For example, a cluster 66 representing the latest measured data is applied to the map 64. The position and values of this cluster 66 and the current map 64 can be compared to the historical wells 60 and 62. In this example, the current cluster 66 continues a path that is similar to a path shown in 60. This similarity is used to estimate the location of a cluster (a predicted cluster 68). If the predicted cluster represents a desirable state, then no remedial action is necessary. However, if this path was shown by the historical well 60 to lead to an undesirable state, then remedial action can be taken by adjusting operational parameters (e.g., RPM, fluid pressure).

Movement along a particular path of a map can be used for prediction, and also for decisions on what to change to avoid (or ensure) following the path. Drilling operational challenges already experienced in a previous operation can thus be identified and avoided by such a comparative case-based reasoning approach.

In the fifth stage 45, using the topological map (or a current topological map in conjunction with historical map), various parameters of a downhole operation are controlled or adjusted.

It is noted that the specific shapes and configurations of data clusters shown herein are exemplary and non-limiting. In addition, the types of data described herein are not limited. Furthermore, the types of downhole operations and data parameters are not limited to those described herein.

For example, the method 40 is not limited to drilling operations. Oilfield or energy industry operations can encompass many processes in the area of exploring, drilling, completing, and operating wellbores, such as producing hydrocarbons, injecting water, brine or other fluids into a reservoir to enhance reservoir production, and simulating and modeling a hydrocarbon reservoir to understand its geology and relevant physical processes. The completion of wells for petroleum production may be conducted using different techniques, such as open hole completions, perforation of cased wells, wire wrapped screen completions and others. Well tests may be conducted in conjunction with completions to determine hydraulic and other reservoir properties, the integrity of wellbores and other useful information that is relevant for operating the wells. Other operations include stimulation of hydrocarbon reservoirs to increase the productivity of a producing well. For example, hydraulic stimulation may be conducted by injecting stimulation fluid under high pressure into the reservoir which creates an artificial fracture of large hydraulic conductivity. Acquired pressure and injected volume data can be analyzed and interpreted to derive hydraulic and/or mechanical properties that are relevant to characterize the reservoir efficiency. Operations may also utilize situational data, which may encompass any other data that could have an impact or effect on energy industry operations or conditions. Such situational data may include, for example, weather, politics, the time of year and others.

The methods described herein are not limited to use with single borehole operations. For example, multiple wells may be continuously or periodically monitored. Well data such as pressure, volume and temperature (PVT) data are recorded, analyzed and interpreted to understand the overall efficiency of one or multiple reservoirs. In addition to using acquired data to derive parameters from single wells, reservoir simulation can be conducted based on a geological underground model and the prevailing physical and chemical processes. Calibration of the reservoir model is conducted by matching the history of PVT data to those data acquired in the different wells.

FIGS. 5-13 illustrate examples of the application of topological data analysis as described above to well data associated with drilling operations. Although the examples are described in conjunction with drilling operations, the techniques described in these examples could be applied to other types of downhole operations, such as stimulation, formation evaluation, completion and production operations.

Various types of data were collected, including data describing the status of the wellbore (e.g., formation evaluation logs, temperatures, time and depth), data describing the control of a drilling operation (e.g., weight-on-bit, rotations per minute (RPM) and flow-in), and data describing the outcome of a drilling operation such as rate-of-penetration, caliper, annular pressure, gains, losses, and gas readings.

One or more tools in a drill string, such as a BHA, MWD and/or LWD tools were used to collect data. For example, the drill string includes one or more of sensors for measuring WOB, torque, BHA bending moment, annulus and bore pressure, accelerations, magnetic fields and temperature. Other exemplary sensors or devices include sensors for directional, gamma ray, resistivity, vibration, neutron porosity, density, and/or acoustic measurements. In the examples described below, the analysis was applied to raw data with no interpolation, but is not so limited, as data may be filtered or otherwise processed as desired prior to performing the analysis method.

Data was collected for various parameters. In one embodiment, as described in the examples below, the data parameters are grouped generally into control parameters, outcome parameters and status parameters. Parameters may be classified preliminarily into one of these groups, although in some instances, groupings may change (e.g., some parameters may be control in one instance and outcome in another). For example, if a drilling operation is controlled in a way that the rate-of-penetration is automatically kept constant, the rate-of-penetration may be considered to be a control parameter and the weight-on-bit is considered to be an outcome parameter.

Control parameters relate to operational parameters that can be set and adjusted to control a downhole operation. Exemplary control parameters include weight-on-bit (WOB), average WOB, rotation parameters (e.g., drill bit RPM, motor RPM, and surface RPM,) density of injected fluid, flowrate of injected fluid (also referred to as "flow-in"), hook load and directional parameters (e.g., inclination).

Outcome parameters relate to the behavior or characteristics of the drill string and other components of a borehole, such as drilling fluid and return fluid, as a result of the operation. Exemplary outcome parameters include, for example, vibrational characteristics such as stick-slip, torque, density parameters (e.g., density of return fluid), differential pressure, surge pressure, return flow rate (also referred to as "flow-out"), pump pressure, fluid gain and/or loss, gas percentage of return fluid, rate of penetration (ROP), temperature of injected fluid and/or return fluid, and equivalent circulating density (ECD).

Status parameters relate to the status of the operation, including drilling or other operational states, the operational status of the drill string and characteristics of the surrounding formation. Exemplary status parameters include bulk density, temperature, depth, true vertical depth (TVD), bit depth, resistivity, gamma, neutron porosity and drilling time.

As shown in the following examples, topological data analysis can be applied separately to control, outcome and status parameters or applied to some combination thereof. The accumulation of drilling control, outcome or status parameters could be mapped by the topology analysis, and some topology maps could be used to identify similarities between different parameters.

In each of the following examples, parameters are selected for analysis (e.g., control parameters and/or outcome parameters). Parameter selection is not limited to that described in the examples, as any collected data parameters may be used in the analysis. The method may be applied to on-bottom/drilling data, other data (off-bottom, flow-off) or both. In addition, the method may be applied to various types of data, such as reaming data, underreaming data, data acquired with or without rotating the drill string, coring data etc. Such data may represent any of various drilling or other operational states, such as reaming, tripping, off-bottom, circulating, coring, etc.

In these examples, an analysis is performed by clustering the selected data as clusters or nodes and generating a map of the relative positions of the nodes. Various distance metrics, lenses and resolution parameters are selected as inputs for generation of the map.

Structures or constellations formed by groups of nodes and corresponding parameters are analyzed to identify attributes of particular map structures. Parameters used in mapping the data, or other parameters excluded from the mapping, may be used to apply additional coding to the map, for example by varying node size, color-coding or shading nodes to indicate parameter levels. The distribution of such parameter levels on the map can be correlated with various other parameters. The analysis may be repeated with different metrics and/or lenses. In addition, the lens resolution and/or gain may be adjusted in order to create particular structural shapes.

Figure 5:
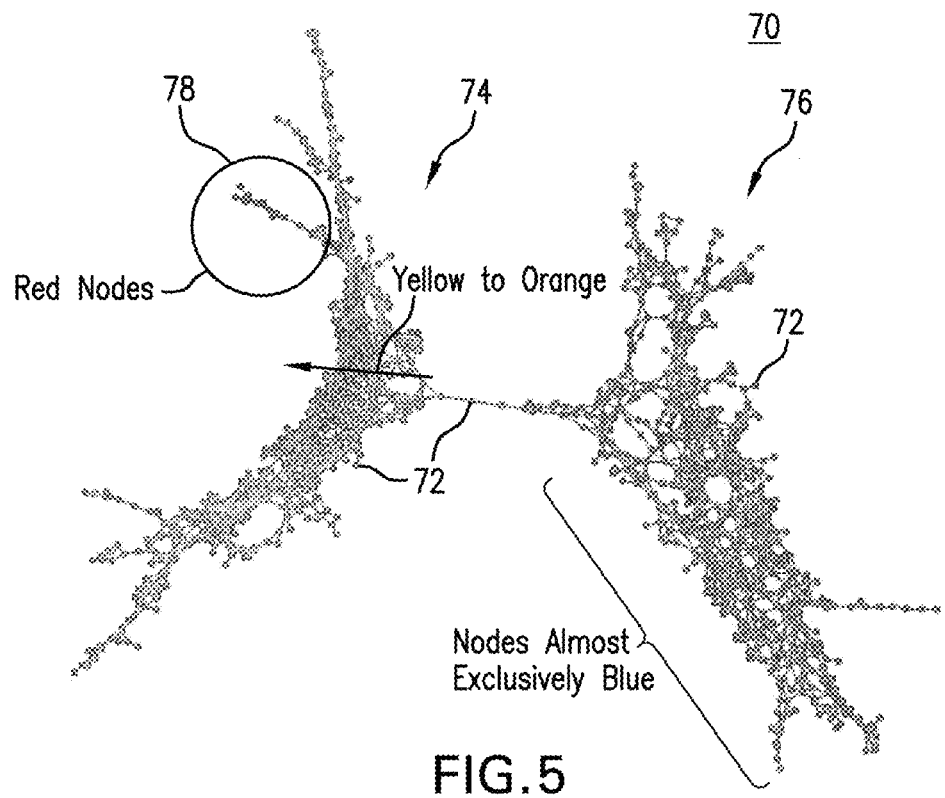
FIG. 5 depicts an exemplary topological map generated using drilling data.
Figure 6:
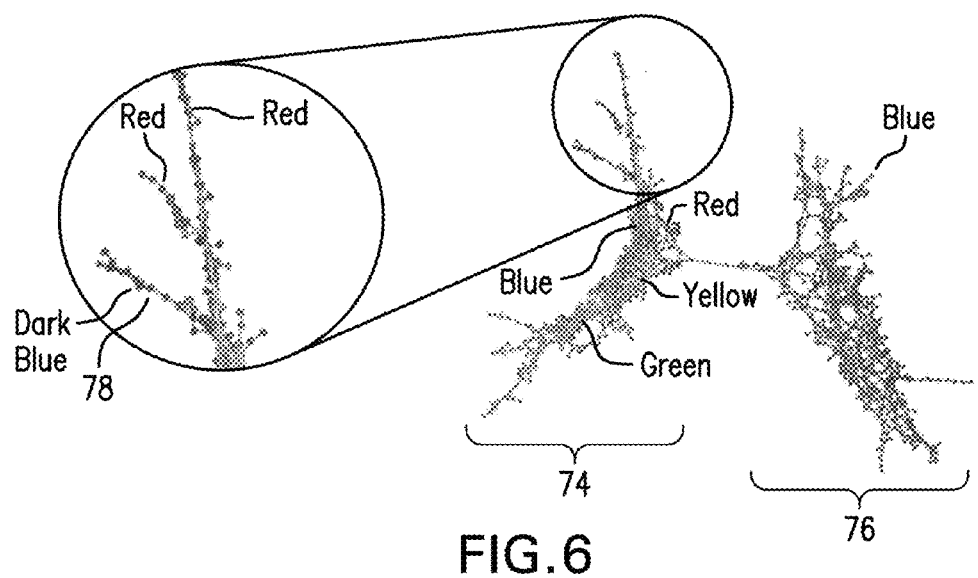
FIG. 6 depicts the map of FIG. 5 and an expanded portion thereof.

Referring to FIGS. 5 and 6, in one example, a topology map 70 including a plurality of nodes 72 was generated using selected control parameters. The control parameters in this example include real-time downhole WOB, real-time drill string RPM measured downhole, average motor RPM measured downhole, mud weight at the surface, flow in rate at surface, average bit RPM measured at surface, average WOB at surface, average motor RPM at surface and surface RPM of drill string. In this example, each node represents data values for each parameter at a selected time.

Data for these parameters were clustered into nodes 72 and plotted per the method 40. The applied metric was a variance normalized Euclidean metric, and two lenses were applied: L-infinity Centrality (with a resolution of 100 and a gain of 1.5×) and Gaussian density (with a resolution of 100 and a gain of 1.5×).

As shown, the map 70 includes two separate regions or structures that connect only through very few nodes. Two sub-maps (structures 74 and 76) were defined to analyze the difference between the two regions (structure 74 containing 544 nodes and structure 76 containing 639 nodes).

Various parameters can be applied to the map to determine whether the structures correspond to specific parameter values or to specific conditions or drilling states. One such applied parameter was time, which was applied to the map 70 by color-coding each node by time value (not shown). This coding revealed that time was not the main differentiator between the structures.

FIG. 5 shows the distribution of flow-in values on the map 70. The map 70 in FIG. 5 is color-coded such that node color represents a value or magnitude of the measured flow-in, or a range of values or magnitudes. It is noted that in the examples described herein color-coding is defined as providing a different color for different magnitude or value ranges. In these examples, nodes representing the highest values for an applied parameter are shown in red. The colors range from high to low, progressing in order of magnitude from red (highest) to orange, yellow, green, light blue and dark blue (lowest).

Although applying a parameter to a topological map is described as color-coding, this application is not so limited. Any type of visual indication or representation may be used to represent data values or value ranges, such as shading, node shape and node size.

In this example, color-coding shows that the two regions 74 and 76 are primarily differentiated between low-flow (structure 76) and high-flow (structure 74) conditions.

In addition, the map 70 was color-coded by status data such as LWD formation evaluation data to determine whether further insight can be gained from the map. Although not shown, color coding by gamma ray values reveals that structure 74 tends to lower values. Coding by neutron porosity distribution indicates lower values in the structure 74 compared to the right-hand side structure 76.

FIG. 6 shows the map 70 color-coded by resistivity values. Each node 72, which is associated with a time period or one or more time steps, is color-coded (low to high) according to the resistivity value associated with the node's respective time value. As shown, the resistivity distribution tends to increase from right to left, with generally higher values on the left. The entire right group (structure 76) exhibits low resistivity values throughout. Thus, comparison of FIGS. 5 and 6 show that low-flow conditions correlate with low resistivity values in this example.

Another structure identified in this example is a flared structure (shown as flare 78), which deviates from the structure 74 and shows very high flow conditions. As shown in FIG. 6, this flare 78 corresponds with low resistivity similar to values like those in structure 76. Color-coding by ECD also shows that this flare is characterized by very high ECD values. This reveals that flare 78 nodes are associated with anomalous behavior distinct both from behavior in structure 74 and from behavior in structure 76, however, there are similarities in behavior of some states along these nodes and some states within structure 74. This in turn suggests that optimizing drilling if the state is mapped to this location is likely to require different values of the control parameters than for other states.

Accordingly, the map 70 and application of various parameters thereto provides an indication of a relationship between flow-in conditions and formation properties.

In addition to correlating structures with different conditions, accumulations of parameter values may be used to correlate between parameters. For example, although Weight-on-bit (WOB) does not differentiate significantly between the structures 74 and 76 in the map 70, high and low WOB values accumulate in the map 70. In particular, one very high WOB region correlates very well with high stick-slip levels.

Figure 7:
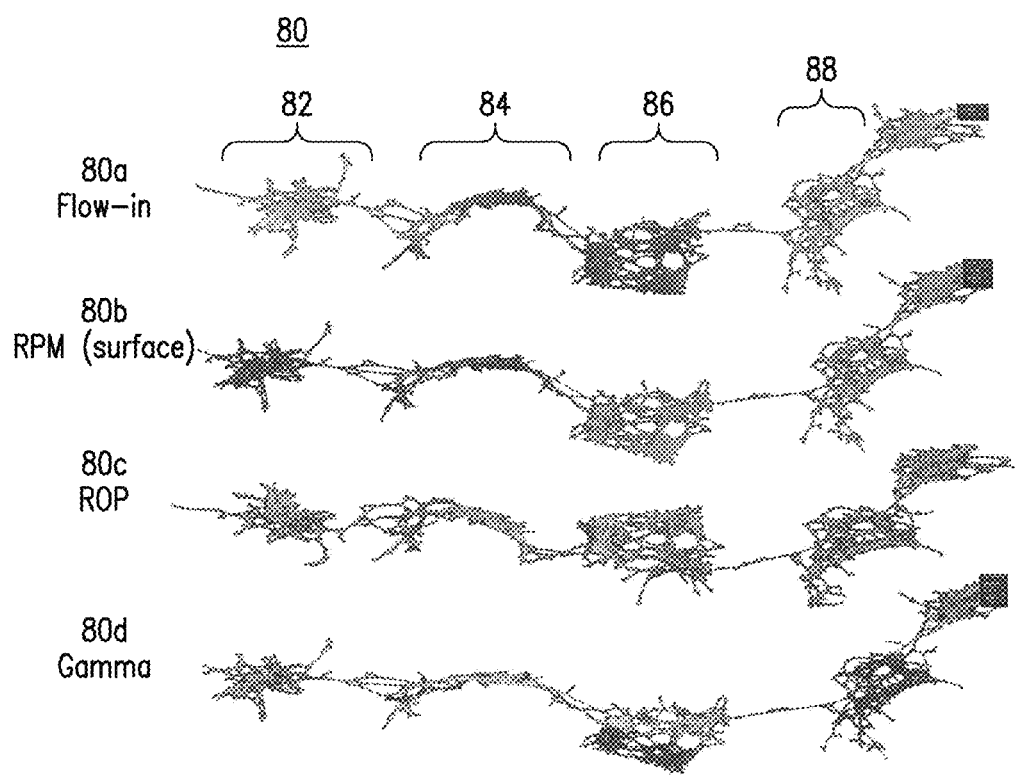
FIG. 7 depicts an exemplary topological map having color-coding for various parameters.

FIG. 7 shows an example of a topological map 80 generated using selected control parameters. The map was generated with a variance normalized Euclidean metric and the SVD1 and SVD 2 lenses (via principle components analysis), a resolution of 75 and a gain of 2.0×, equalized distribution of points in the bins.

FIG. 7 shows the topological map with different parameters applied to the map after it is plotted. Application of flow-in values to the map by color-coding is shown as map 80a, map 80b shows the map color-coded by RPM value, map 80c shows color-coding by ROP and map 80d shows color-coding by gamma value. It is noted that the nodes and relative positions of nodes are the same for each color-coded map, and the parameters applied to the map were not used to initially plot the map structure (i.e., were different than the parameters used to define and plot nodes to generate map structure).

Color-coding the map by time value (not shown) demonstrated that the topological map 80 does not reflect the temporal development of the drilling run. However, the data can be separated into distinct structures 82, 84, 86 and 88. Analysis of the map 80, including applying different parameters to the map 80, was performed to identify similarities and differences between the different structures.

The maps 80a-80d reveal that the structures 82, 84, 86 and 88 can be associated with different drilling conditions. In this example, each structure corresponds generally to different drilling conditions. Structure 82 corresponds to high flow, low or no RPM, low ROP and low gamma. Structure 84 corresponds to low flow, low or no RPM, low ROP and higher gamma. Structure 86 corresponds to low flow, high RPM, low and high ROP and higher or no gamma. Structure 88 corresponds to high flow, high RPM, high ROP and no or low gamma.

The examples of FIGS. 5-7 show that structures may be present that correspond to various operating or drilling conditions. For example, generating a topological map using drilling control parameters gives structures that can be differentiated between different operational conditions as well as lithologies that may correlate with the operational conditions.

In one embodiment, topological maps such as maps 70 and 80 are generated during a downhole operation, and structures are analyzed during operation to determine whether such structures can be correlated with conditions or states such as operational conditions, borehole conditions or formation characteristics or lithologies. This information may be used to monitor the operation and adjust operational parameters where desired, e.g., to avoid or correct for undesirable conditions. In another embodiment, maps such as maps 70 and 80 are used as a predictive tool, in which structures representing certain conditions are identified. The maps may be used to correlate between different parameters (e.g., correlate flow properties with lithology) to predict the behavior of future operations. The maps may also be used to predict properties of the formation, for example, location in structure 82 suggests values of GR that map to cyan. In addition, the structures identified may be used to monitor subsequent operations, by generating maps for subsequent operations (e.g., under similar conditions or in a similar formation) and identifying conditions by analyzing the structures of the subsequent maps and/or the progression of subsequent map structures over time.

For example, creating a topology map from gains and losses and gas readings, the wellbore status (such as the formation where gains and losses occurred) and the control (such as the flow rate) of a drilling operation can be checked, in order to identify if e.g. losses always occur at a given flow rate in a specific formation.

Identified structures can be associated with specific drilling conditions, particularly those that may be undesirable or present a challenge to the operator. Such conditions include, for example, losses, gains, high differential pressure downhole, and high stick-slip. The structures associated with such conditions can be analyzed using control data to determine whether certain drilling procedures correlate with such conditions.

Figure 8:
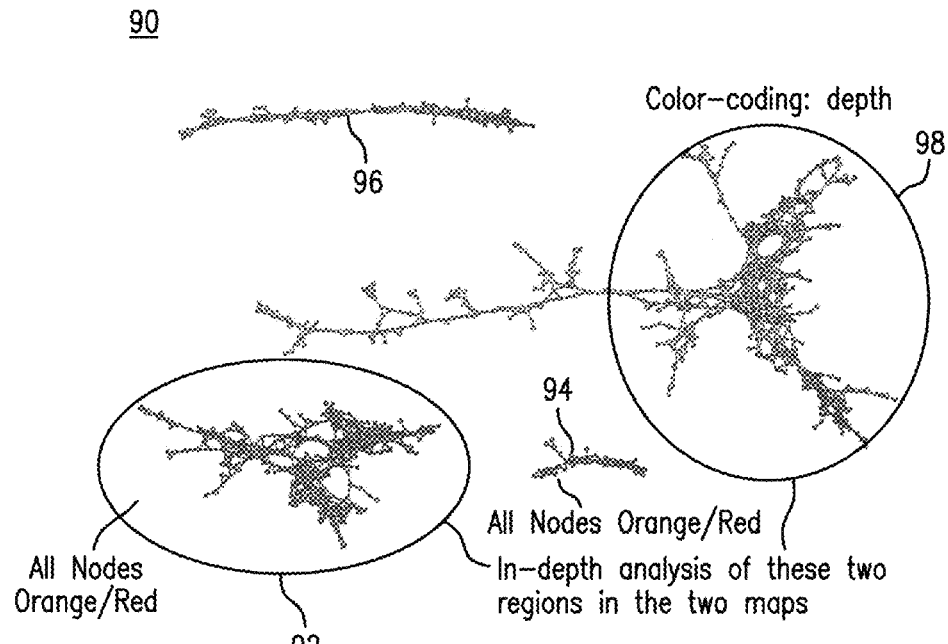
FIG. 8 depicts an exemplary topological map.
Figure 9:
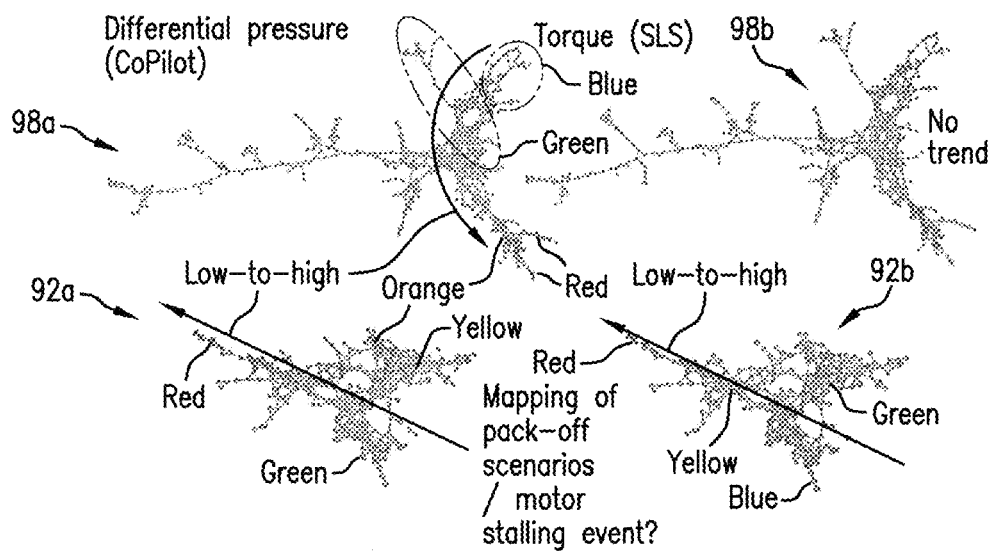
FIG. 9 depicts the map of FIG. 8 having color-coding for two different parameters.

FIGS. 8 and 9 show a topological map 90 that was plotted using outcome parameters for monitoring conditions in a drilled borehole. The map 90 was used to visualize specific drilling controls and/or wellbore statuses by correlating structure in the map 90 with such conditions. In this example, the outcome parameters used to plot the map 90 include real-time caliper, real-time stick-slip, real-time torque, real-time differential pressure, mud weight out at surface, flowrate out at surface, gains/losses, average torque at surface, total gas percentage at surface, average ROP at surface and real time Equivalent circulating density (ECD). The map 90 was created using variance normalized density as the metric, and SVD 1 and 2 (Res 300, Gain 1.5) as lenses.

Plotting the data for these outcome parameters yielded the map 90 that includes four different, unconnected structures. The map 90 in FIG. 8 is color-coded by depth. The two lower structures 92 and 94 are clearly from only the deepest section of the borehole, and the two upper structures 96 and 98 include data from shallower sections of the borehole.

FIG. 9 shows the structures 92 and 98 color-coded by differential annular pressure (shown as structures 92*a* and 98*a*) and surface torque (shown as structures 92*b* and 98*b*).

FIG. 9 shows trends that appear to persist in both structures 92 and 98 for the differential pressure. A similar trend is observed for torque, i.e., an increasing trend of torque, in the structure 92. This correlation between the differential pressure and torque in structure 92 may be an indication of cuttings accumulating between a drill bit and a pressure sensor, and/or an indication of motor stalling which increases the pressure inside the drill string. Thus, this structure may provide an indication that a stall or pack-off event has occurred. FIGS. 8 and 9 show an example of a method of analyzing topological maps of data to identify and/or predict undesirable events.

In one embodiment, a method includes generating one or more topology maps and utilizing one or more maps for prediction. For example, a topology map is generated as described above for a selected set of parameters. Structures that include specific parameter value ranges can be identified, e.g., by color-coding the map by a selected parameter. The map can be regenerated and color-coded using various different parameters to determine whether different parameter values or ranges can be correlated with the selected parameter.

In another example, a topology map may be generated using a first set of parameters (e.g., outcome parameters) and compared to topology maps generated using different sets of parameters to determine whether the maps include similar structures that can be correlated with different parameters. For example, a first topology map is generated using outcome parameters and a second map is generated using status parameters (e.g., gamma ray, bulk density, compressional slowness etc.) to check if certain outcome parameters can be associated with a specific lithology. Similar structures can be analyzed to determine whether similar structures in the second map can be associated with a set of lithology parameters.

Figure 10:
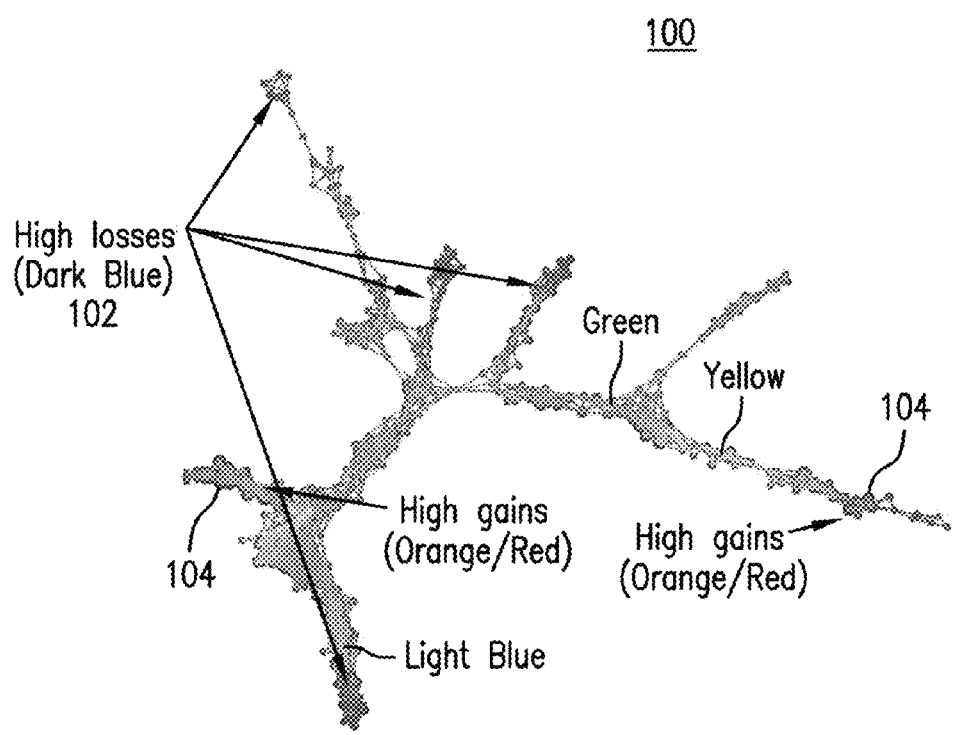
FIG. 10 depicts an exemplary topological map color-coded by fluid gains and losses.
Figure 11:
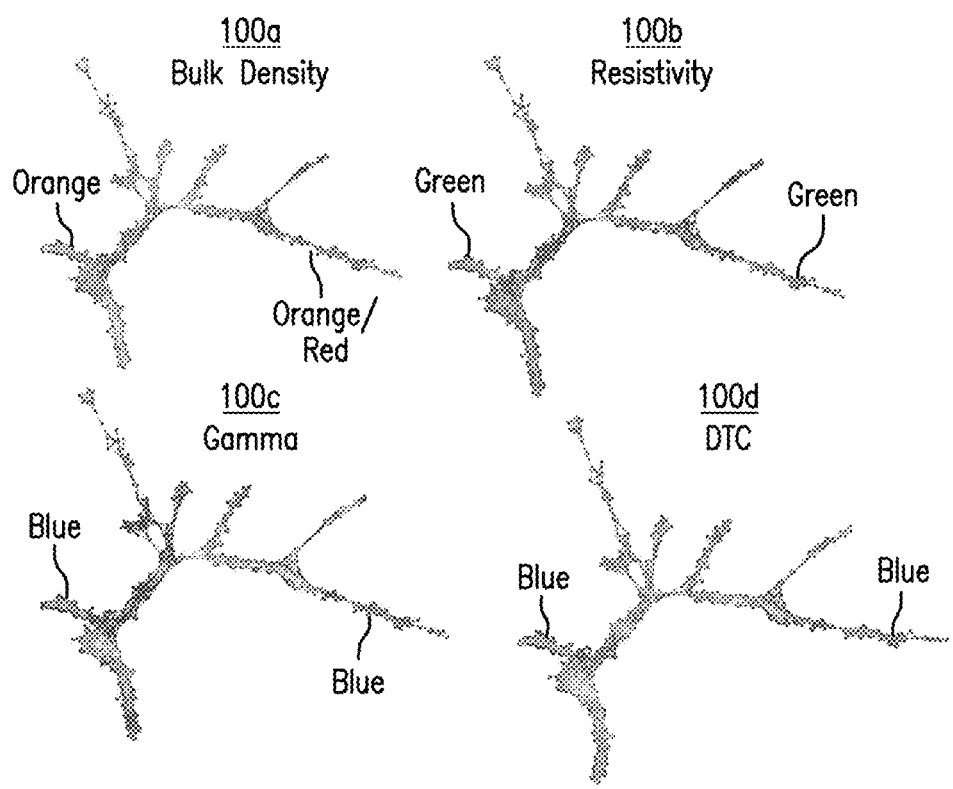
FIG. 11 depicts the map of FIG. 10 having color-coding for different parameters.

FIGS. 10-11 illustrate the use of topology maps for prediction. Topology map 100 was plotted using outcome parameters including real-time caliper, real-time stick-slip, real-time torque, real-time differential pressure, mud weight out at surface, flowrate out at surface, average torque at surface, gains and losses, total gas percentage at surface, average ROP at surface and real time equivalent circulating density (ECD). The map 100 was created with the cosine metric, the L-infinity centrality lens (Res 30, gain 2.5) and a second Gaussian density lens (Res 30, gain 2.5). It is noted that the resulting map 100 includes structures that are based on the above outcome parameters and are not based directly on depth or time. FIG. 10 shows the map 100 color-coded by gains and losses, which clearly shows identifiable flares 102 associated with high losses and flares 104 associated with high gains.

As shown in FIG. 11, the topology generated as shown in FIG. 10 was then color-coded by various status parameters. FIG. 11 shows the map 100 color-coded by bulk density (identified as map 100*a*), resistivity (identified as map 100*b*), gamma (identified as map 100*c*) and compressional wave slowness (DTC) (identified as map 100*d*).

In this example, high gains correlate well with low gamma, high bulk density, intermediate resistivity and low DTC. High losses correlate with intermediate density, low resistivity, low DTC and low gamma. Accordingly, gains and losses can be seen from the map topology to originate from specific formations having identifiable characteristics.

The topology map 100 of FIGS. 10 and 11 was then compared to a topology map that was created using the outcome parameters, but with gain and loss parameters excluded, to determine whether a specific structure or constellation could be associated with high gains or high losses. In addition, a topology map was created from wellbore status parameters such as gamma ray, bulk density, compressional slowness and others to determine whether such a map includes similar structures. Similar structures identified in the topology maps provide a prediction that high gains and losses can be associated with a specific lithology.

Figure 13:
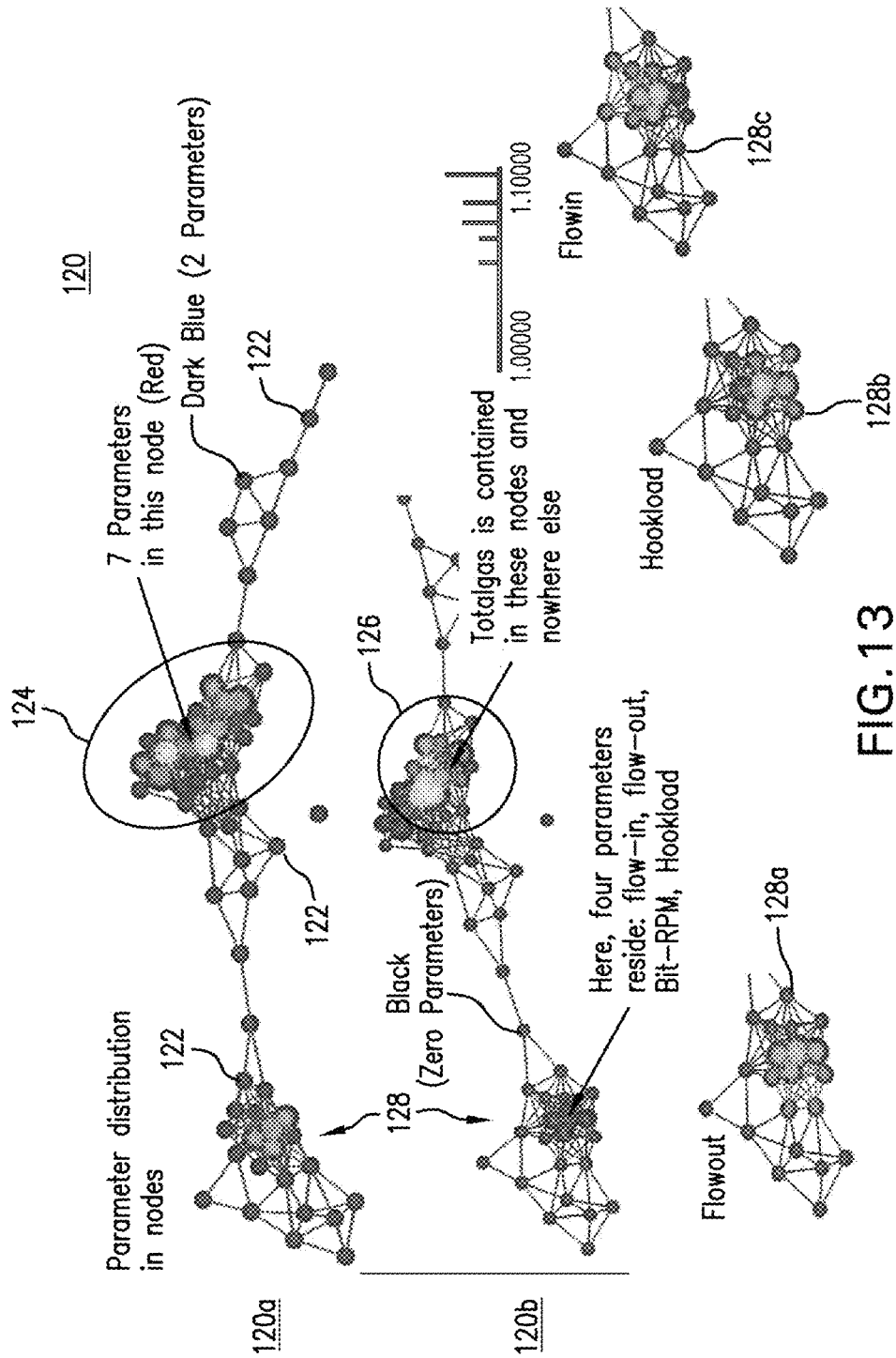
FIG. 13 depicts an exemplary topological map generated using the data of FIG. 12.

Referring to FIGS. 12 and 13, in one embodiment, analysis of collected data includes considering the population of values for each individual parameter, and capturing correlations or similarities between the population of one variable and the population of another variable. For example, instead of considering each data subset to include values of multiple parameters for a given time or depth, each data subset includes a plurality of values of a parameter.

For example, collected data is typically organized by time or depth, and thus each time or depth value is associated with a value for each parameter. The collected data in this embodiment may be transposed so that each parameter is associated with a value for each time value. An example of this transposition is shown in FIG. 12, which shows a portion of an exemplary data set 110 organized by time, and a portion of the data set 112 after it is transposed (now organized by parameter) so that time is a parameter (i.e. rows transposed to columns and columns transposed to rows). Whereas embodiments of the analyses described above aim to identify similarities of drilling parameters acquired at different times or depths, analyzing transposed data aims to identify similarities between the time-variation or other data properties of different parameters.

This embodiment provides a way to investigate, by topological data analysis, if the population of one parameter is similar or dissimilar to the population of another parameter. The population of a parameter may be a group of values of the parameter, where each value is associated with a different time or depth. For example, the temporal development of flow-in should be similar to the temporal development of flow-out, because, at normal conditions, the flow-out rate is a direct outcome of the flow-in rate. However, if gains or losses are experienced, this correlation is not valid anymore. Thus, determining the similarity or dissimilarity between the temporal development of flow-in and flow-out can be useful in identifying whether abnormal conditions are present.

FIG. 13 shows a topology map 120 generated using the transposed data set 102. Each node 122 includes parameters having data populations that are similar with respect to temporal development. Each node may represent a different number of parameters. For example, map 120a shows the map 120 where each node is color-coded by the number of parameters represented. Most nodes contain two parameters that are similar to each other, whereas some nodes contain up to seven parameters. Region 124 includes a group of nodes having more than two parameters. Map 120b includes nodes color-coded by the "total gas" parameter. Region 126 includes nodes that include the total gas parameter.

Similarities between parameters may be identified by correlating parameters in similar structures as described above. For example, the map 120 includes an identifiable structure 128. Color coding the structure by flow-out, hook load and flow-in is shown at 128a, 128b and 128c respectively. As shown, these parameters are located within a similar structure, and may thus be correlated.

Generally, some of the teachings herein are reduced to an algorithm that is stored on machine-readable media. The algorithm is implemented by a computer or processor such as the surface processing unit 38 and provides operators with desired output. For example, data may be transmitted in real time from the tool 34 or sensors 36 to the surface processing unit 38 for processing. As described herein, a processor may refer to one or more processors configured to perform all or part of the various methods described herein. For example, the methods described herein may be performed by a single processor processing unit (e.g., the surface processing unit 38) or by multiple processors (e.g., an a cloud computing or network). In addition, a "processor" may include one or more downhole or surface processors associated with a drilling or other oilfield operation, e.g., processors reducing the complexity of the data (such as by data compression) or acting as pre-processors.

The systems and methods described herein provide various advantages over prior art techniques. The topological maps described herein provide an intuitive indication of operational conditions and states, as well as the ability to predict future states based on a current or historical map. In addition, the methods described herein do not require a priori understanding of the physical processes involved, pre-interpretation or pre-processing of the data and can handle arbitrarily large data sets. The maps can reveal similarities or relationships between various parameters that are not evident using other correlation methods (e.g., that resistivity and flow-in data cluster in similar nodes). In addition, the systems and methods described herein provide for easy understanding of the relationship(s) between different operational conditions by clustering data according to such conditions as opposed to simply representing data on a time or depth scale. The analysis and methods are also beneficial for the analysis of multiple drilling operations.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of performing a drilling operation, comprising:
   receiving, by a processor, a data set representing parameter values generated during at least a portion of the operation, the parameter values including values of a plurality of parameters relating to the operation; and
   performing aspects of a drilling operation by the processor, wherein performing includes:
   dividing the data set into a plurality of data subsets, each data subset including values for multiple parameters;
   determining a measure of similarity between data in each subset relative to data in one or more other subsets;
   displaying a map of the data set in at least two dimensions, the map including a visual representation of each subset positioned relative to a visual representation of the one or more other subsets based on the measure of similarity, each visual representation having a position relative to one or more other visual representations and a proximity to the one or more other visual representations based on the measure of similarity;
   analyzing the map to estimate a condition associated with the operation, wherein analyzing includes identifying a group of visual representations representing subsets having at least one similar parameter, and estimating the condition based on a shape or structure formed by the group of visual representations; and
   adjusting a parameter of the drilling operation based on analyzing the map.

2. The method of claim 1, further comprising predicting a future state of the operation based on the structure.

3. The method of claim 1, wherein displaying includes representing each data set as a cluster, and displaying the clusters as part of a topological map of the data set.

4. The method of claim 3, wherein analyzing includes identifying a structure formed by a group of clusters, and associating the structure with at least one of an operational condition, a borehole condition and a formation condition.

5. The method of claim 4, further comprising applying a selected parameter to the map by coding each cluster according to a value of the selected parameter associated with the data set represented by the cluster.

6. The method of claim 5, wherein analyzing includes correlating the selected parameter with the structure based on an identifiable distribution of the selected parameter values within the structure.

7. The method of claim 4, wherein analyzing includes monitoring the operation to identify conditions based on the structure.

8. The method of claim 4, further comprising predicting whether the condition will occur in future operations based on parameters of the future operations and the map.

9. The method of claim 1, wherein the data set includes a plurality of parameters, each parameter having multiple values associated with different times or depths, and dividing the data set includes transposing the data set so that each time or depth is considered to have multiple values associated with different parameters, and each data subset is generated by selecting one or more parameters and including a population of values for each selected parameter, each of the population of values associated with a different time or depth.

10. The method of claim 9, wherein determining the measure of similarity includes identifying a progression of the population of values for each selected parameter, the visual representation representing two or more selected parameters having at least a similar progression.

11. The method of claim 1, wherein each data subset is associated with at least one of a different time and a different depth.

12. A system for performing a drilling operation, comprising:
    at least one carrier configured to be disposed in a borehole in an earth formation;
    a plurality of sensors configured to measure parameters associated with the operation; and
    a processor configured to perform:
    receiving a data set representing parameter values generated during at least a portion of the operation, the parameter values including values of a plurality of parameters relating to the operation;
    dividing the data set into a plurality of data subsets, each data subset including values for multiple parameters;
    determining a measure of similarity between data in each subset relative to data in one or more other subsets;
    displaying a map of the data set in at least two dimensions, the map including a visual representation of each subset positioned relative to a visual representation of the one or more other subsets based on the measure of similarity, each visual representation having a position relative to one or more other visual representations and a proximity to the one or more other visual representations based on the measure of similarity;
    analyzing the map to estimate a condition associated with the operation, wherein analyzing includes identifying a group of visual representations representing subsets having at least one similar parameter, and estimating the condition based on a shape or structure formed by the group of visual representations; and
    adjusting a parameter of the drilling operation based on analyzing the map.

13. The system of claim 12, wherein displaying includes representing each data set as a cluster, and displaying the clusters as part of a topological map of the data set.

14. The system of claim 13, wherein analyzing includes identifying a structure formed by a group of clusters, and associating the structure with at least one of an operational condition, a borehole condition and a formation condition.

15. The system of claim 14, wherein the processor is configured to apply a selected parameter to the map by coding each cluster according to a value of the selected parameter associated with the data set represented by the cluster.

16. The system of claim 15, wherein analyzing includes correlating the selected parameter with the structure based on an identifiable distribution of the selected parameter values within the structure.

17. The system of claim 14, wherein analyzing includes monitoring the operation to identify conditions based on the structure.

18. The system of claim 14, wherein the processor is configured to predict whether the condition will occur in future operations based on parameters of the future operations and the map.

19. The system of claim 12, wherein the data set includes a plurality of parameters, each parameter having multiple values associated with different times or depths, and dividing the data set includes transposing the data set so that each time or depth is considered to have multiple values associated with different parameters, and each data subset is generated by selecting one or more parameters and including a population of values for each selected parameter, each of the population of values associated with a different time or depth.

20. The system of claim 19, wherein determining the measure of similarity includes identifying a progression of the population of values for each selected parameter, the visual representation representing two or more selected parameters having at least a similar progression.

* * * * *